US012085896B2

(12) United States Patent
Hasebe et al.

(10) Patent No.: US 12,085,896 B2
(45) Date of Patent: Sep. 10, 2024

(54) POINTER DEVICE AND TIMEPIECE

(71) Applicant: Casio Computer Co., Ltd., Tokyo (JP)

(72) Inventors: Kyohei Hasebe, Tachikawa (JP); Takashi Suizu, Fussa (JP); Koji Namiki, Higashimurayama (JP); Makoto Sawada, Nishitokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 442 days.

(21) Appl. No.: 17/476,253

(22) Filed: Sep. 15, 2021

(65) Prior Publication Data

US 2022/0083008 A1 Mar. 17, 2022

(30) Foreign Application Priority Data

Sep. 17, 2020 (JP) ................................ 2020-156285

(51) Int. Cl.
*G04B 27/00* (2006.01)
*G04B 1/10* (2006.01)
*G04B 13/02* (2006.01)

(52) U.S. Cl.
CPC ............... *G04B 27/00* (2013.01); *G04B 1/10* (2013.01); *G04B 13/02* (2013.01)

(58) Field of Classification Search
None
See application file for complete search history.

(56) References Cited

U.S. PATENT DOCUMENTS 2,697,324 A * 12/1954 Morganson .......... G04B 27/001 968/249

FOREIGN PATENT DOCUMENTS

| | | | | |
|---|---|---|---|---|
| FR | 1348213 A | | 1/1964 | |
| JP | 5777967 U | | 5/1982 | |
| JP | H05-014978 U | | 2/1993 | |
| JP | 2000009524 A | * | 1/2000 | ........... H05B 6/6411 |

OTHER PUBLICATIONS

Translation of JP2000009524, Espacenet, (Year: 2023).*

Office Action, issued Nov. 28, 2022, for Chinese Patent Application No. 202111087624.8. (19 pages) (with English Translation).

Japanese Notice of Reasons for Refusal, dated Jul. 20, 2022, for corresponding Japanese Patent Application No. 2020-156285. (8 pages) (with English translation).

* cited by examiner

*Primary Examiner* — Renee S Luebke
*Assistant Examiner* — Matthew Hwang
(74) *Attorney, Agent, or Firm* — Seed IP Law Group LLP

(57) ABSTRACT

A pointer device including a rotation body, a pointer shaft provided on the rotation body, a base member which rotatably supports the pointer shaft, and a spiral spring which has a substantially truncated conical shape and is arranged between the rotation body and the base member.

6 Claims, 5 Drawing Sheets

POINTER DEVICE AND TIMEPIECE

CROSS-REFERENCE TO RELATED APPLICATION

This application is based upon and claims the benefit of priority from the prior Japanese Patent Application No. 2020-156285, filed Sep. 17, 2020, the entire contents of which are incorporated herein by reference.

BACKGROUND

1. Technical Field

The present disclosure relates to a pointer device and a timepiece equipped with the pointer device.

2. Description of the Related Art

For example, Japanese Utility-Model Application Laid-Open (Kokai) Publication No. 05-014978 discloses a technique in which a plate spring is arranged between a pointer wheel for moving a pointer and a wheel train holding member for rotatably holding the pointer wheel, and the rotation angle of the pointer wheel is regulated by a load being applied to the pointer wheel by the spring force of the plate spring.

SUMMARY

One embodiment is a pointer device comprising: a rotation body; a pointer shaft provided on the rotation body; a base member which rotatably supports the pointer shaft, and a spiral spring which has a substantially truncated conical shape and is arranged between the rotation body and the base member.

The above and further objects and novel features of one embodiment will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 5A and FIG. 5B are diagrams showing each end of the spiral spring shown in FIG. 4, of which FIG. 5A is an enlarged view of the outer circumferential end on the large diameter side, and FIG. 5B is an enlarged view of the inner circumferential end on the small diameter side.

DETAILED DESCRIPTION OF THE PREFERRED EMBODIMENT

An embodiment where the present invention has been applied in a wristwatch will hereinafter be descried with reference to FIG. 1 to FIG. 5B.

Figure 1:
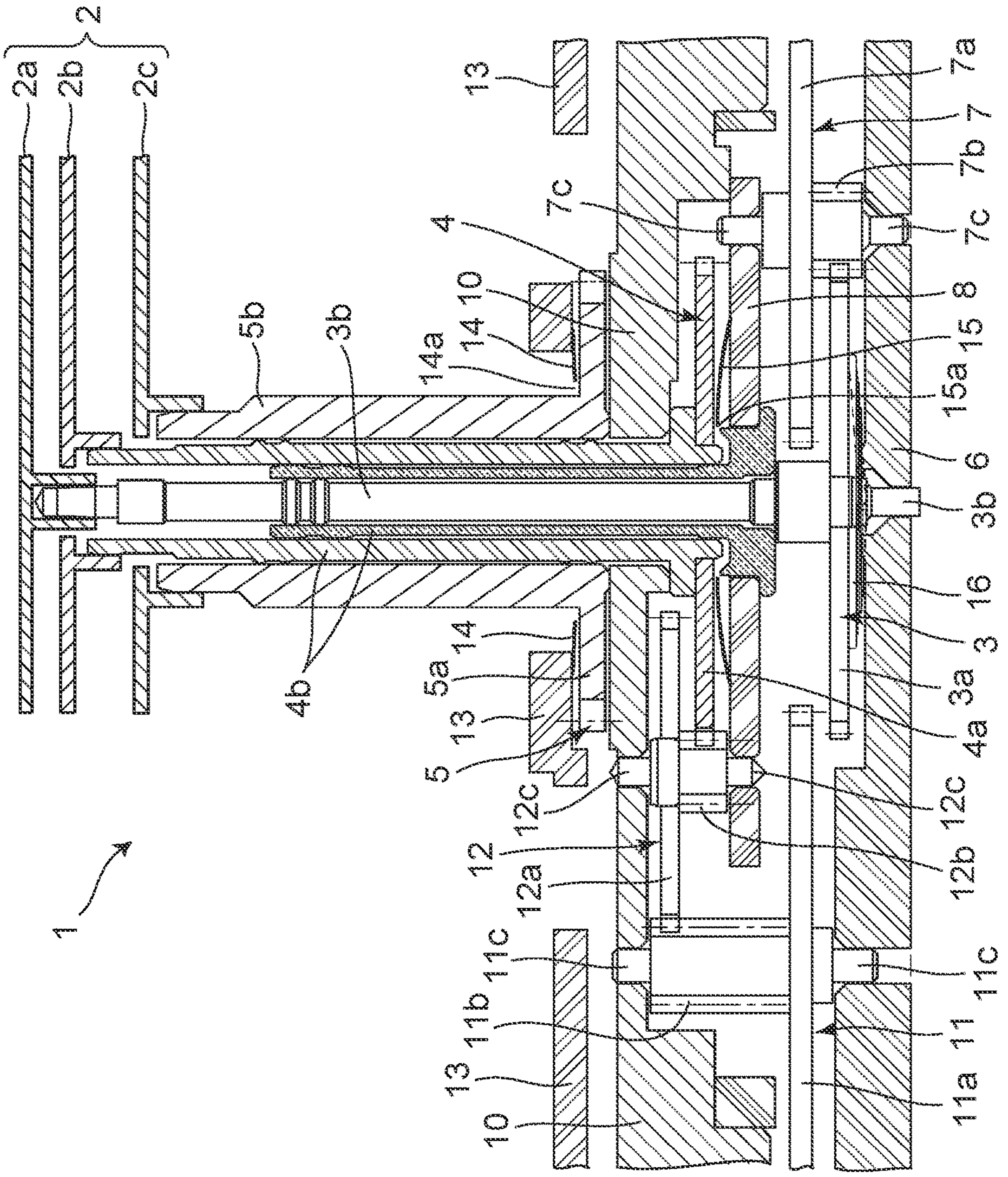
FIG. 1 is an enlarged sectional view showing a main portion of an embodiment where the present invention has been applied in a pointer device for a wristwatch.

This wristwatch includes a pointer device 1, as shown in FIG. 1. The pointer device 1 is part of a timepiece movement for moving pointers 2 such as a second pointer 2*a*, a minute pointer 2*b*, and an hour pointer 2*c*, and is structured to be mounted in a wristwatch case (not shown) that is a main body of the wristwatch.

More specifically, the pointer device 1 includes a second pointer wheel 3 that is a fourth wheel, a minute pointer wheel 4 that is a second wheel, and an hour pointer wheel 5 that is an hour wheel, and they are coaxially arranged, as shown in FIG. 1. The second pointer wheel 3 includes a second pointer gear wheel 3*a* that is a rotation body, and a second pointer shaft 3*b* provided on the center of the second pointer gear wheel 3*a*, and is structured such that the second pointer gear wheel 3*a* is rotated centering on the second pointer shaft 3*b*. Also, this second pointer wheel 3 is structured such that the second pointer 2*a* is attached to the upper end of the second pointer shaft 3*b*, and the lower end of the second pointer shaft 3*b* is rotatably attached to a wheel train holding member 6 which is a base member.

Moreover, this second pointer wheel 3 is structured such that the rotation of a first intermediate wheel 7 rotated by a first driving source (not shown) such as a step motor is transmitted to and rotates the second pointer gear wheel 3*a*, and the second pointer shaft 3*b* moves the second pointer 2*a* in conjunction with the rotation of the second pointer gear wheel 3*a*, as shown in FIG. 1. The first intermediate wheel 7 includes a first intermediate gear wheel 7*a*, a first pinion 7*b*, and a first intermediate shaft 7*c*, which are coaxially provided. The first intermediate shaft 7*c* of the first intermediate wheel 7 is rotatably attached to the wheel train holding member 6 and an intermediate holding member 8.

The first intermediate gear wheel 7*a* is rotated by the first driving source (not shown) such as a step motor, as shown in FIG. 1. The first pinion 7*b*, with which the second pointer gear wheel 3*a* of the second pointer wheel 3 is engaged, is rotated in conjunction with the first intermediate gear wheel 7*a* so as to rotate the second pointer wheel 3. Thus, the first intermediate wheel 7 is structured such that the first intermediate gearwheel 7*a* is rotated by the first driving source (not shown) such as a step motor, the first pinion 7*b* is rotated in conjunction with the rotation of the first intermediate gear wheel 7*a*, and this rotation of the first pinion 7*b* rotates the second pointer wheel 3.

The minute pointer wheel 4 includes a minute pointer gear wheel 4*a* that is a rotation body, and a minute pointer shaft 4*b* provided on the center of the minute pointer gear wheel 4*a*, and is structured such that the minute pointer gear wheel 4*a* is rotated centering on the minute pointer shaft 4*b*, as shown in FIG. 1. The minute pointer shaft 4*b* is a cylindrical shaft, and is structured such that the minute pointer 2*b* is attached to its upper end, the second pointer shaft 3*b* is rotatably inserted thereinto, and the upper end of the second pointer shaft 3*b* is arranged upwardly protruding therefrom. This minute pointer shaft 4*b* is rotatably attached to the intermediate holding member 8 and a main plate 10 which is a base plate.

Also, the minute pointer wheel 4 is structured such that the rotation of a second driving source (not shown) such as a step motor, which is different from the first driving source for the second pointer wheel 3, is transmitted to and rotates the minute pointer gearwheel 4*a* via a second intermediate wheel 11 and a third intermediate wheel 12, and the minute pointer shaft 4*b* moves the minute pointer 2*b* in conjunction with the rotation of the minute pointer gear wheel 4*a*, as shown in FIG. 1. The second intermediate wheel 11 includes a second intermediate gear wheel 11*a*, a second pinion 11*b*, and a second intermediate shaft 11*c*, which are coaxially provided.

The second intermediate shaft 11*c* of the second intermediate wheel 11 is rotatably attached to the wheel train holding member 6 and the main plate 10, as shown in FIG. 1. The second intermediate gear wheel 11*a* is rotated by the second driving source (not shown) such as a step motor. The second pinion 11*b*, with which a later-described third intermediate gear wheel 12*a* of the third intermediate wheel 12 is engaged, is rotated in conjunction with the second intermediate gear wheel 11*a* so as to rotate the third intermediate wheel 12.

Thus, the second intermediate wheel 11 is structured such that the second intermediate gear wheel 11*a* is rotated by the second driving source (not shown) such as a step motor, the second pinion 11*b* is rotated in conjunction with the rotation of the second intermediate gear wheel 11*a*, and this rotation of the second pinion 11*b* rotates the third intermediate wheel 12, as shown in FIG. 1.

The third intermediate wheel 12 includes the third intermediate gear wheel 12*a*, a third pinion 12*b*, and a third intermediate shaft 12*c*, which are coaxially provided, as shown in FIG. 1. The third intermediate shaft 12*c* of this third intermediate wheel 12 is rotatably attached to the main plate 10 and the intermediate holding member 8.

The third intermediate gear wheel 12*a* is rotated by the second pinion 11*b* of the second intermediate wheel 11, as shown in FIG. 1. The third pinion 12*b* is rotated in conjunction with the third intermediate gear wheel 12*a* so as to rotate the minute pointer wheel 4. This third pinion 12*b* is structured to engage with the minute pointer gear wheel 4*a* of the minute pointer wheel 4 and transmit the rotation of the third intermediate wheel 12 to the minute pointer wheel 4.

Thus, the third intermediate wheel 12 is structured such that the rotation of the second intermediate gear wheel 11*a* rotated by the second driving source (not shown) such as a step motor is transmitted to the third intermediate gear wheel 12*a* via the second pinion 11*b* so as to rotate the third intermediate gear wheel 12*a*, the third pinion 12*b* is rotated in conjunction with the rotation of the third intermediate gear wheel 12*a*, and this rotation of the third pinion 12*b* rotates the minute pointer wheel 4, as shown in FIG. 1.

The hour pointer wheel 5 includes an hour pointer gear wheel 5*a* that is a rotation body, and an hour pointer shaft 5*b* provided on the center of the hour pointer gear wheel 5*a*, and is structured such that the hour pointer gear wheel 5*a* is rotated centering on the hour pointer shaft 5*b*, as shown in FIG. 1. The hour pointer shaft 5*b* is formed in a cylindrical shape, and is structured such that the hour pointer 2*c* is attached to its upper end, the minute pointer shaft 4*b* is rotatably inserted thereinto together with the second pointer shaft 3*b*, and the upper end of the minute pointer shaft 4*b* is arranged upwardly protruding therefrom together with the upper end of the second pointer shaft 3*b*.

Also, the hour pointer wheel 5 is structured such that the hour pointer gear wheel 5*a* is arranged on the main plate 10 and rotatably held down by a gear wheel hold-down member 13, as shown in FIG. 1. Moreover, the hour pointer wheel 5 is structured such that the rotation of the minute pointer gear wheel 4*a* of the minute pointer wheel 4 is transmitted to the hour pointer gear wheel 5*a* via a fourth intermediate wheel (not shown) that is a minute wheel, the hour pointer gear wheel 5*a* is rotated thereby, and the hour pointer shaft 5*b* moves the hour pointer 2*c* in conjunction with the rotation of the hour pointer gear wheel 5*a*.

Here, although not shown in the drawings, the fourth intermediate wheel includes a fourth intermediate gear wheel, a fourth pinion, and a fourth intermediate shaft, which are coaxially arranged. The fourth intermediate shaft is rotatably attached to the main plate 10 and arranged vertically protruding therefrom. The fourth intermediate gear wheel is arranged on the main plate 10 and rotated while being engaged with the hour pointer gear wheel 5*a*. The fourth pinion is arranged under the main plate 10 and rotated in conjunction with the fourth intermediate wheel while being engaged with the minute pointer gear wheel 4*a* of the minute pointer wheel 4.

Thus, although not shown in the drawings, the fourth intermediate wheel is structured such that the rotation of the minute pointer gear wheel 4*a* rotated by the second driving source (not shown) such as a step motor is transmitted to the fourth pinion so as to rotate the fourth pinion, the fourth intermediate gear wheel is rotated in conjunction with the rotation of the fourth pinion, and this rotation of the fourth intermediate gear wheel rotates the hour pointer wheel 5.

Between the hour pointer gear wheel 5*a* of the hour pointer wheel 5 and the gear wheel hold-down member 13, a first plate spring 14 is arranged, as shown in FIG. 1. The first plate spring 14 is formed by a ring-shaped disk being curved in a plate shape, and a first insertion hole 14*a* into which the hour pointer shaft 5*b* is inserted is formed in its center. This first plate spring 14 is structured such that its inner rim portion forming the first insertion hole 14*a* is positioned on the upper surface of the hour pointer gear wheel 5*a* and its outer rim portion is positioned on the undersurface of the gear wheel hold-down member 13.

As a result, this first plate spring 14 is sandwiched between the hour pointer gear wheel 5*a* and the gear wheel hold-down member 13 while maintaining its spring force to apply a load to the hour pointer gear wheel 5*a* so as to regulate the rotation angle of the hour pointer gear wheel 5*a*, whereby the rotation of the hour pointer wheel 5 is stabilized and the hour pointer 2*c* is favorably moved, as shown in FIG. 1.

Also, between the minute pointer gear wheel 4*a* of the minute pointer wheel 4 and the intermediate holding member 8, a second plate spring 15 is arranged, as shown in FIG. 1. The second plate spring 15 is formed by a ring-shaped disk being carved in a plate shape, and a second insertion hole 15*a* into which the minute pointer shaft 4*b* is inserted is formed in its center, as with the first plate spring 14. This second plate spring 15 is structured such that its inner rim portion forming the second insertion hole 15*a* is positioned on the undersurface of the minute pointer gear wheel 4*a* and its outer rim portion is positioned on the upper surface of the intermediate holding member 8.

As a result, the second plate spring 15 is sandwiched between the minute pointer gear wheel 4*a* and the intermediate holding member 8 while maintaining its spring force to apply a load to the minute pointer gear wheel 4*a* so as to regulate the rotation angle of the minute pointer gear wheel 4*a*, whereby the rotation of the minute pointer wheel 4 is stabilized and the minute pointer 2*b* is favorably moved as in the case of the first plate spring 14, as shown in FIG. 1.

Also, between the second pointer gearwheel 3*a* of the second pointer wheel 3 and the wheel train holding member 6, a spiral spring 16 having a substantially truncated conical shape is arranged coaxially with the second pointer shaft 3*b*, as shown in FIG. 1 to FIG. 4. This spiral spring 16 is formed in the substantially truncated conical shape by a wire 17 being wound in a spiral shape and its small diameter section 16*a* on the center side being raised in an expansion/contraction direction so as to be higher than its large diameter section 16*b* on the outer circumferential side. Here, the inner diameter of the small diameter section 16*a* is greater than the outer diameter of the second pointer shaft 3*b*.

Figure 2:
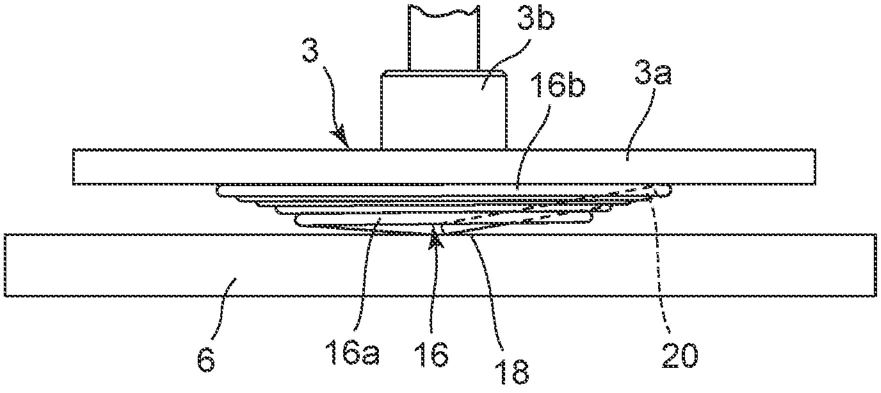
FIG. 2 is an enlarged side view of a main portion where a spiral spring has been arranged between a second pointer wheel and a wheel train holding member in the pointer device shown in FIG. 1.
Figure 3:
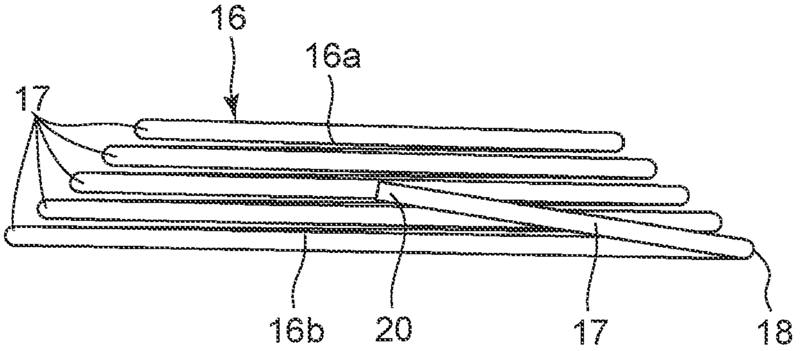
FIG. 3 is an enlarged perspective view showing the spiral spring of FIG. 2 in an inverted and free state.
Figure 4:
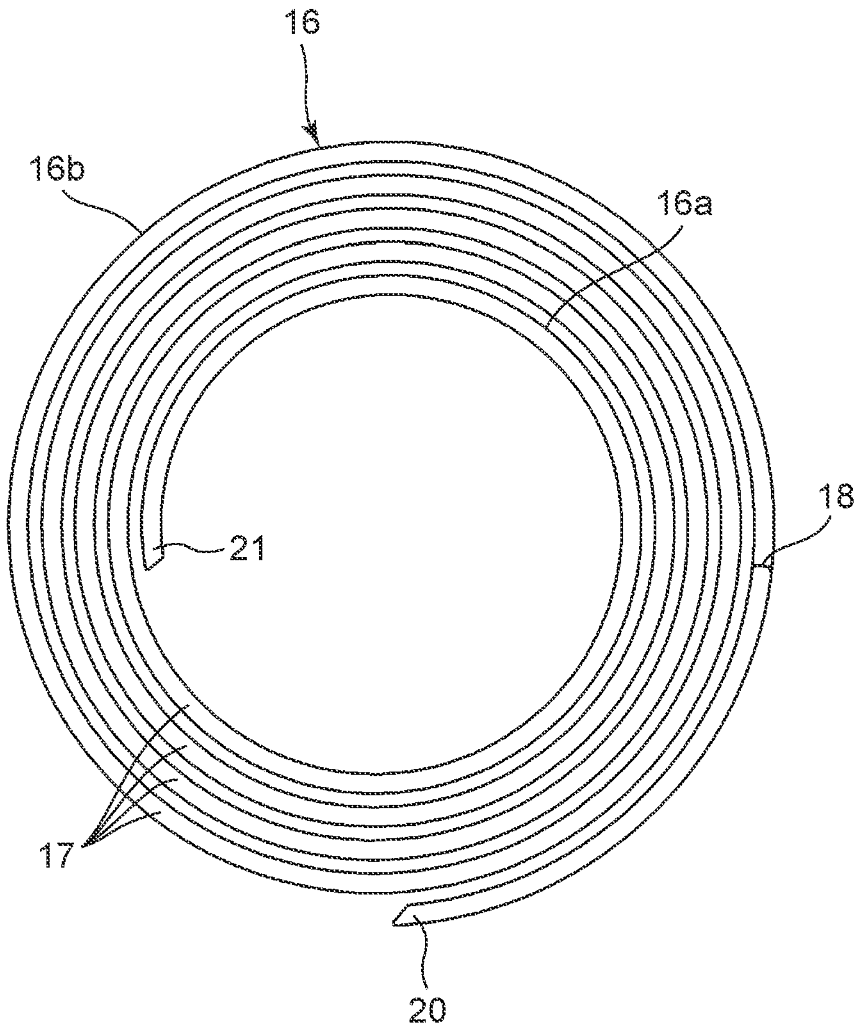
FIG. 4 is an enlarged planar view of the spiral spring shown in FIG. 3.

The wire 17 of the spiral spring 16 is formed such that its wire diameter is thin and its entire length is sufficiently longer than the wire diameter, as shown in FIG. 2 to FIG. 4. More specifically, this wire 17 is, for example, made of metal such as stainless steel and is formed such that its wire diameter is as thin as about 0.1 mm and its entire length is about 10 mm, that is, 100 times the wire diameter, which is sufficiently longer than the wire diameter. Also, this spiral spring 16 is formed such that its entire length (height) in the expansion/contraction direction in its free state is about 0.2 mm to 0.6 mm. Note that this length should preferably be about 0.4 mm.

Thus, the spiral spring 16 is structured such that, in a case where an interval between the second pointer gear wheel 3*a* and the wheel train holding member 6 is 0.1 to 0.2 mm, the entire length of the spiral spring 16 in the expansion/contraction direction in its free state is compressed to a length of half or less when arranged between the second pointer gear wheel 3*a* and the wheel train holding member 6. As a result, the spiral spring 16 is structured so as to apply a stable spring force to the second pointer gear wheel 3*a* with a low spring constant since the entire length of the wire 17 is about 100 times the wire diameter of the wire 17, as shown in FIG. 2 to FIG. 4.

Also, the spiral spring 16 is structured such that the large diameter section 16*b* is positioned on the undersurface of the second pointer gear wheel 3*a*, and the small diameter section 16*a* is positioned on the upper surface of the wheel train holding member 6, as shown in FIG. 2 to FIG. 4. That is, the spiral spring is structured such that its area in contact with the undersurface of the second pointer gearwheel 3*a* is greater than its area in contact with the upper surface of the wheel train holding member 6, whereby frictional resistance by the spring force of the spiral spring 16 with respect to the undersurface of the second pointer gear wheel 3*a* is stable.

Moreover, the spiral spring 16 is structured such that part of the outer circumferential portion of the large diameter section 16*b* is bent toward the wheel train holding member 6 at an inclination angle of about 10 degrees, as shown in FIG. 2 to FIG. 4. That is, a bent section 18 is formed on part of the outer circumferential portion of the large diameter section 16*b* of the spiral spring 16. As a result, the spiral spring 16 is structured such that an outer circumferential end section 20 of the wire 17 bent at the bent section 18 toward the wheel train holding member 6 is positioned on the upper surface of the wheel train holding member 6 together with an inner circumferential end section 21 of the wire 17 on the small diameter section 16*a* side.

The outer circumferential end section 20 of the wire 17 bent toward the wheel train holding member 6 is structured such that its position in the expansion/contraction direction of the spiral spring 16 corresponds to a substantially middle point of the length of the spiral spring 16 in the expansion/contraction direction in its free state, as shown in FIG. 2 and FIG. 3. As a result, the spiral spring 16 is structured such that, when it is arranged between the second pointer gear wheel 3*a* and the wheel train holding member 6, its length in the expansion/contraction direction is compressed to a length of half or less, whereby the outer circumferential end section 20 of the wire 17 is pressed against the upper surface of the wheel train holding member 6 at an inclination angle of about 10 degrees.

As a result of this structure of the spiral spring 16, the outer circumferential end section 20 of the wire 17 on the large diameter section 16*b* side is not positioned on the undersurface of the second pointer gear wheel 3*a*, and the bent section 18 of the outer circumferential portion of the large diameter section 16*b* is positioned on the undersurface of the second pointer gearwheel 3*a*, as shown in FIG. 1 to FIG. 4. Consequently, the spiral spring 16 is structured such that, since the large diameter section 16*b* is not caught by the undersurface of the second pointer gearwheel 3*a* by the presence of the curved surface of the bent section 18, the second pointer gear wheel 3*a* is smoothly rotated, and the spiral spring 16 is not rotated with respect to the wheel train holding member 6 by the outer circumferential end section 20 of the wire 17 on the large diameter section 16*b* side and the inner circumferential end section 21 of the wire 17 on the small diameter section 16*a* side being pressed against the upper surface of the wheel train holding member 6.

This spiral spring 16 is formed by the wire 17 being wound in the normal rotation direction of the second pointer gear wheel 3*a* that is a rotation body, or in other words, the same direction as the clockwise direction in which the second pointer 2*a* is moved, as shown in FIG. 1 to FIG. 4. That is, the spiral spring 16 is formed by the wire 17 being spirally wound in the clockwise direction from a point corresponding to the inner circumferential end section 21 of the wire 17 on the small diameter section 16*a* side toward a point corresponding to the outer circumferential end section 20 of the wire 17 on the large diameter section 16*b* side.

As a result, the spiral spring 16 is structured such that, when the second pointer wheel 3 is being rotated in the clockwise direction in which the second pointer 2*a* is moved, the outer circumferential end section 20 of the wire 17 on the large diameter section 16*b* side is caught by the upper surface of the wheel train holding member 6, whereby the clockwise rotation of the spiral spring 16 with respect to the wheel train holding member 6 is prevented, as shown in FIG. 2 to FIG. 4.

Also, the spiral spring 16 is structured such that, when the second pointer wheel 3 is being rotated in the direction opposite to the clockwise direction in which the second pointer 2*a* is moved, the inner circumferential end section 21 of the wire 17 on the small diameter section 16*a* side is caught by the upper surface of the wheel train holding member 6, whereby the counterclockwise rotation of the spiral spring 16 with respect to the wheel train holding member 6 is prevented, as shown in FIG. 2 to FIG. 4. That is, in both cases where the second pointer wheel 3 is rotated in the clockwise direction and it is rotated in the counter-clockwise direction, the spiral spring 16 is not rotated with respect to the wheel train holding member 6.

The outer circumferential end section 20 of the wire 17 on the large diameter section 16*b* side of the spiral spring 16 is formed such that its edge on the outer circumferential side forms a sharp angle by the wire 17 being obliquely cut with respect to its central axis, as shown in FIG. 4 and FIG. 5. That is, the outer circumferential end section 20 of the wire 17 on the large diameter section 16*b* side is obliquely cut with respect to a radial direction of the spiral spring 16 such that its edge on the outer circumferential side forms a sharp angle.

Figure 5A:
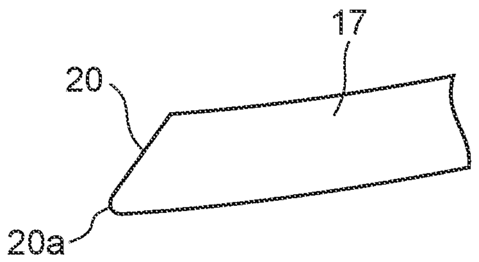

On this sharply angled portion of the outer circumferential end section 20 of the wire 17 on the large diameter section 16*b* side, a first chamfered section 20*a* is provided, as shown in FIG. 5A. The first chamfered section 20*a* is formed by removing burrs generated during cutting of the outer circumferential end section 20, and has a small arc shape whose radius is about 5 μm. As a result of this structure, the outer circumferential end section 20 of the wire 17 on the large diameter section 16*b* side is easily caught by the upper surface of the wheel train holding member 6 when the second pointer wheel 3 is being rotated in the clockwise direction in which the second pointer 2*a* is moved.

As in the case of the outer circumferential end section 20 of the wire 17, the inner circumferential end section 21 of the wire 17 on the small diameter section 16*a* side of the spiral spring 16 is formed such that its edge on the outer circumferential side forms a sharp angle by the wire 17 being obliquely cut with respect to its central axis, as shown in FIG. 4 and FIG. 5. That is, the inner circumferential end section 21 of the wire 17 on the small diameter section 16*a* side is obliquely cut with respect to a radial direction of the spiral spring 16 such that its edge on the outer circumferential side forms a sharp angle.

Figure 5B:
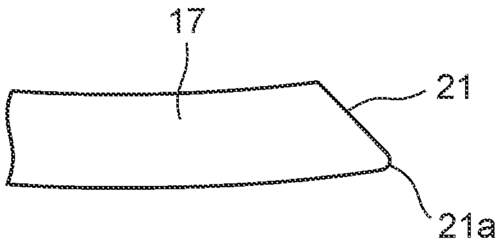

On this sharply angled portion of the inner circumferential end section 21 of the wire 17 on the small diameter section 16*a* side, a second chamfered section 21*a* is provided, as shown in FIG. 5B. As with the outer circumferential end section 20 of the wire 17, the second chamfered section 21*a* is formed by removing burrs generated during cutting of the inner circumferential end section 21, and has a small arc shape whose radius is about 5 μm. As a result of this structure, the inner circumferential end section 21 of the wire 17 on the small diameter section 16*a* side is easily caught by the upper surface of the wheel train holding member 6 when the second pointer wheel 3 is being rotated in the direction opposite to the clockwise direction in which the second pointer 2*a* is moved.

Next, the mechanism of the pointer device 1 is described.

First, the minute pointer wheel 4 and the hour pointer wheel 5 are described. The minute pointer wheel 4 moves the minute pointer 2*b* by the rotation of the second driving source (not shown) such as a step motor being transmitted to the minute pointer gear wheel 4*a* via the second intermediate wheel 11 and the third intermediate wheel 12 and the minute pointer shaft 4*b* being rotated together with the minute pointer gear wheel 4*a*.

Here, a load is applied to the minute pointer gear wheel 4*a* by the spring force of the second plate spring 15 arranged between the minute pointer gear wheel 4*a* of the minute pointer wheel 4 and the intermediate holding member 8, and the rotation angle of the minute pointer gear wheel 4*a* is regulated by frictional resistance between the minute pointer gear wheel 4*a* and the second plate spring 15 due to this load. As a result, the rotation of the minute pointer wheel 4 is stabilized and the minute pointer 2*b* is favorably moved.

Also, the hour pointer wheel 5 moves the hour pointer 2*c* by the rotation of the minute pointer wheel 4 being transmitted to the hour pointer gear wheel 5*a* via the fourth intermediate wheel (not shown) and the hour pointer shaft 5*b* being rotated together with the hour pointer gear wheel 5*a*. Here, as in the case of the minute pointer wheel 4, a load is applied to the hour pointer gearwheel 5*a* by the spring force of the first plate spring 14 arranged between the hour pointer gear wheel 5*a* of the hour pointer wheel 5 and the gear wheel hold-down member 13, and the rotation angle of the hour pointer gear wheel 5*a* is regulated by frictional resistance between the hour pointer gear wheel 5*a* and the first plate spring 14 due to this load. As a result, the rotation of the hour pointer wheel 5 is stabilized and the hour pointer 2*c* is favorably moved.

On the other hand, the second pointer wheel 3 moves the second pointer 2*a* by the rotation of the first driving source such as a step motor being transmitted to the second pointer gear wheel 3*a* via the first intermediate wheel 7 and the second pointer shaft 3*b* being rotated together with the second pointer gear wheel 3*a*. Here, a load is applied to the second pointer gear wheel 3*a* by the spring force of the spiral spring 16 having the substantially truncated conical shape and arranged between the second pointer gear wheel 3*a* of the second pointer wheel 3 and the wheel train holding member 6.

Accordingly, on the second pointer wheel 3, frictional resistance is generated between the second pointer gear wheel 3*a* and the spiral spring 16 due to the load applied to the second pointer gear wheel 3*a* by the spring force of the spiral spring 16, and the rotation angle of the second pointer gear wheel 3*a* is regulated by this frictional resistance. As a result, the rotation of the second pointer wheel 3 is stabilized, whereby the second pointer 2*a* is accurately stabilized, and precisely and favorably moved.

Here, the spiral spring 16 has the substantially truncated conical shape where the wire 17 having a thin wire diameter has been wound in a spiral shape and its small diameter section 16*a* on the center side has been raised in the expansion/contraction direction so as to be higher than its large diameter section 16*b* on the outer circumferential side. That is, the entire length of the wire 17 is sufficiently longer than its wire diameter. Accordingly, the spring force of the spiral spring 16 can be easily controlled, so that a stable spring force can be applied to the second pointer gearwheel 3*a* with the low spring constant.

Also, when the spiral spring 16 is to be arranged between the second pointer gear wheel 3*a* and the wheel train holding member 6 in a manner to be coaxially positioned with the second pointer shaft 3*b*, the entire length of the spiral spring 16 in the expansion/contraction direction is compressed to a length of half or less since the entire length of the spiral spring 16 in the expansion/contraction direction in its free state is greater than the interval between the second pointer gear wheel 3*a* and the wheel train holding member 6. In this state, the large diameter section 16*b* of the spiral spring 16 is arranged on the undersurface of the second pointer gear wheel 3*a*, and the small diameter section 16*a* is arranged on the upper surface of the wheel train holding member 6.

Here, the area of the large diameter section 16*b* of the spiral spring 16 in contact with the undersurface of the second pointer gear wheel 3*a* is greater than the area of the small diameter section 16*a* of the spiral spring 16 in contact with the upper surface of the wheel train holding member 6. Accordingly, the spring force of the spiral spring 16 is stably and widely applied to the undersurface of the second pointer gear wheel 3*a*, whereby frictional resistance is stable over the wide area between the second pointer gear wheel 3*a* and the large diameter section 16*b* of the spiral spring 16.

As a result of this structure, when the second pointer wheel 3 is being rotated, the rotation angle of the second pointer gear wheel 3*a* is precisely and favorably regulated by frictional resistance stably occurring in the wide area between the second pointer gear wheel 3*a* and the large diameter section 16*b* of the spiral spring 16, whereby the second pointer gear wheel 3*a* is stably and precisely rotated and the second pointer 2*a* is accurately and favorably moved.

Also, here, part of the outer circumferential portion of the large diameter section 16*b* of the spiral spring 16 has been bent at the bent section 18 toward the wheel train holding member 6, and the outer circumferential end section 20 of this bent wire 17 has been positioned on the upper surface of the wheel train holding member 6 together with the inner circumferential end section 21 of the wire 17 on the small diameter section 16*a* side. Accordingly, when the second pointer wheel 3 is being rotated, the rotation of the spiral spring 16 with respect to the wheel train holding member 6 is prevented and whereby the spiral spring 16 does not rotate with the second pointer gear wheel 3*a*.

Moreover, when the second pointer wheel 3 is being rotated, the outer circumferential end section 20 of the wire 17 on the large diameter section 16*b* side of the spiral spring 16 is not positioned on the second pointer gear wheel 3*a*, and the bent section 18 of the outer circumferential portion of the large diameter section 16*b* is positioned on the undersurface of the second pointer gear wheel 3*a*. Accordingly, by the presence of the curved surface of the bent section 18, the spiral spring 16 is not caught by the second pointer gear wheel 3*a*, whereby the second pointer gear wheel 3*a* is smoothly rotated with respect to the spiral spring 16.

When the spiral spring 16 is to be arranged between the second pointer gear wheel 3*a* and the wheel train holding member 6 while being compressed, the outer circumferential end section 20 of the wire 17 on the large diameter section 16*b* side is pressed against the upper surface of the wheel train holding member 6 at an inclination angle of about 10 degrees together with the inner circumferential end section 21 of the wire 17 on the small diameter section 16*a* side. Accordingly, when the second pointer wheel 3 is being rotated, the rotation of the spiral spring 16 with respect to the wheel train holding member 6 is reliably prevented and whereby the spiral spring 16 does not rotate with the second pointer gear wheel 3*a*.

This spiral spring 16 is formed by the wire 17 being wound in the normal rotation direction of the second pointer gear wheel 3*a* that is a rotation body, or in other words, the same direction as the clockwise direction in which the second pointer 2*a* is moved. More specifically, this spiral spring 16 is formed by the wire 17 being spirally wound in the clockwise direction from the point corresponding to the inner circumferential end section 21 of the wire 17 on the small diameter section 16*a* side toward the point corresponding to the outer circumferential end section 20 of the wire 17 on the large diameter section 16*b* side.

Accordingly, when the second pointer wheel 3 is being rotated in the clockwise direction in which the second pointer 2*a* is moved, the outer circumferential end section 20 of the wire 17 on the large diameter section 16*b* side is caught by the upper surface of the wheel train holding member 6, whereby the clockwise rotation of the spiral spring 16 is prevented. Here, the outer circumferential end section 20 of the wire 17 on the large diameter section 16*b* side has been obliquely cut with respect to the central axis of the wire 17, and the first chamfered section 20*a* has been formed on this cut portion forming a sharp angle.

Accordingly, when the second pointer wheel 3 is being rotated in the clockwise direction in which the second pointer 2*a* is moved, the outer circumferential end section 20 of the wire 17 is caught by the upper surface of the wheel train holding member 6 in the clockwise direction by the presence of the first chamfered section 20*a*, whereby the clockwise rotation of the spiral spring 16 is reliably and favorably prevented. As a result, the upper surface of the wheel train holding member 6 is prevented from being scratched by the outer circumferential end section 20 of the wire 17.

Also, when the second pointer wheel 3 is being rotated in the direction opposite to the clockwise direction in which the second pointer 2*a* is moved, the inner circumferential end section 21 of the wire 17 on the small diameter section 16*a* side of the spiral spring 16 is caught by the upper surface of the wheel train holding member 6, whereby the counterclockwise rotation of the spiral spring 16 is prevented. Here, the inner circumferential end section 21 of the wire 17 on the small diameter section 16*a* side of the spiral spring 16 has been obliquely cut with respect to the central axis of the wire 17, and the second chamfered section 21*a* has been formed on this cut portion forming a sharp angle, as with the outer circumferential end section 20 of the wire 17.

Accordingly, when the second pointer wheel 3 is being rotated in the direction opposite to the clockwise direction in which the second pointer 2*a* is moved, the inner circumferential end section 21 of the wire 17 is caught by the upper surface of the wheel train holding member 6 in the counterclockwise direction by the presence of the second chamfered section 21*a*, whereby the counterclockwise rotation of the spiral spring 16 is reliably and favorably prevented. As a result, the upper surface of the wheel train holding member 6 is prevented from being scratched by the inner circumferential end section 21 of the wire 17.

In Japanese Utility-Model Application Laid-Open (Kokai) Publication No. 05-014978 described above, for example, the technique is disclosed in which a plate spring is arranged between a pointer wheel for moving a pointer and a wheel train holding member for rotatably holding the pointer wheel, and the rotation angle of the pointer wheel is regulated by a load being applied to the pointer wheel by the spring force of the plate spring. However, this type of pointer device for wristwatches has a problem in that, when the pointer wheel is being rotated, the plate spring may be unintentionally rotated with respect to the pointer wheel due to frictional resistance between the pointer wheel and the plate spring. More specifically, frictional resistance by the spring force of the plate spring fluctuates, whereby the rotation of the pointer wheel becomes unstable and the rotation angle of the pointer wheel is fluctuated.

In contrast, the pointer device 1 of the present embodiment includes the second pointer gear wheel 3*a* which is a rotation body, the second pointer shaft 3*b* which is a pointer shaft provided on the second pointer gear wheel 3*a*, the wheel train holding member 6 which is a base member and rotatably supports the second pointer shaft 3*b*, and the spiral spring 16 which has the substantially truncated conical shape and is arranged between the second pointer gear wheel 3*a* and the wheel train holding member 6. The large diameter section 16*b* of the spiral spring 16 is arranged on a surface of one of the second pointer gearwheel 3*a* and the wheel train holding member 6, and the small diameter section 16*a* of the spiral spring 16 is arranged on a surface of the other one of the second pointer gear wheel 3*a* and the wheel train holding member 6. As a result of this structure, the fluctuation of the rotation angle of the second pointer gear wheel 3*a* is suppressed and the second pointer gear wheel 3*a* is favorably moved.

That is, in the case of this pointer device 1, when the spiral spring 16 having the substantially truncated conical shape is to be arranged between the second pointer gear wheel 3*a* and the wheel train holding member 6, the large diameter section 16*b* of the spiral spring 16 can be arranged on the surface of one of the second pointer gear wheel 3*a* and the wheel train holding member 6, and the small diameter section 16*a* of the spiral spring 16 can be arranged on the surface of the other one of the second pointer gear wheel 3*a* and the wheel train holding member 6.

As a result, in the pointer device 1, a load is applied to the second pointer gear wheel 3*a* by the spring force of the spiral spring 16 to cause frictional resistance between the spiral spring 16 and the second pointer gear wheel 3*a*. As a result of this frictional resistance due to the spring force of the spiral spring 16, the rotation angle of the second pointer gear wheel 3*a* can be regulated to be constant, whereby the fluctuation of the rotation angle of the second pointer gear wheel 3*a* can be suppressed, the rotation of the second pointer gear wheel 3*a* can be stabilized, and the second pointer gear wheel 3*a* can be favorably rotated.

Also, the spiral spring 16 has the substantially truncated conical shape in which the wire 17 has been wound in a spiral shape and its small diameter section 16*a* on the center side has been raised in the expansion/contraction direction so as to be higher than its large diameter section 16*b* on the outer circumferential side. This shape has enabled the entire length of the spiral spring 16 to be sufficiently longer than the wire diameter thereof. As a result, in the pointer device 1, the spring force of the spiral spring 16 can be easily controlled, and a stable spring force can be applied to the second pointer gear wheel 3*a* with the low spring constant, whereby suitable frictional resistance is generated between the spiral spring 16 and the second pointer gear wheel 3*a*.

Also, in the pointer device 1, since the length (height) of the spiral spring 16 in the expansion/contraction direction in its free state is greater than the interval between the second pointer gear wheel 3*a* and the wheel train holding member 6, the spiral spring 16 is compressed when arranged between the second pointer gear wheel 3*a* and the wheel train holding member 6. As a result of this structure, by the spring force, the large diameter section 16*b* of the spiral spring 16 can be reliably and favorably arranged on the surface of one of the second pointer gear wheel 3*a* and the wheel train holding member 6, and the small diameter section 16*a* of the spiral spring 16 can be reliably and favorably arranged on the surface of the other one of the second pointer gear wheel 3*a* and the wheel train holding member 6.

More specifically, in the pointer device 1, when the spiral spring 16 is being arranged between the second pointer gear wheel 3*a* and the wheel train holding member 6, the length of the spiral spring 16 in the expansion/contraction direction in its free state is compressed to a length of half or less so as to be arranged between the second pointer gear wheel 3*a* and the wheel train holding member 6, so that the large diameter section 16*b* of the spiral spring 16 can be reliably and favorably pressed against the surface of one of the second pointer gear wheel 3*a* and the wheel train holding member 6 and the small diameter section 16*a* of the spiral spring 16 can be reliably and favorably pressed against the surface of the other one of the second pointer gear wheel 3*a* and the wheel train holding member 6 by the spring force of the spiral spring 16.

Also, in the pointer device 1, since the large diameter section 16*b* of the spiral spring 16 is arranged on the undersurface of the second pointer gear wheel 3*a* and the small diameter section 16*a* of the spiral spring 16 is arranged on the upper surface of the wheel train holding member 6, the area of the spiral spring 16 in contact with the undersurface of the second pointer gear wheel 3*a* is greater than the area of the spiral spring 16 in contact with the upper surface of the wheel train holding member 6. As a result of this structure, the spring force of the spiral spring 16 can be stably and favorably applied to the undersurface of the second pointer gear wheel 3*a*, whereby suitable frictional resistance is generated between the second pointer gear wheel 3*a* and the large diameter section 16*b* of the spiral spring 16.

Moreover, in the pointer device 1, the wire 17 corresponding to the outer circumferential portion of the large diameter section 16*b* of the spiral spring 16 is bent toward the wheel train holding member 6, and the outer circumferential end section 20 of this bent wire 17 is positioned on the wheel train holding member 6 together with the inner circumferential end section 21 of the wire 17 corresponding to the inner circumferential portion of the small diameter section 16*a*. As a result, when the second pointer wheel 3 is being rotated, the rotation of the spiral spring 16 with respect to the wheel train holding member 6 can be prevented and whereby the spiral spring 16 does not rotate with the second pointer gear wheel 3*a*.

That is, in the pointer device 1, the bent section 18 is formed on part of the outer circumferential portion of the large diameter section 16*b* of the spiral spring 16, so that the outer circumferential end section 20 side of the spiral spring 16 is bent toward the wheel train holding member 6 at an inclination angle of about 10 degrees. Accordingly, when the length of the spiral spring 16 in the expansion/contraction direction in its free state is compressed to a length of half or less and the spiral spring 16 is arranged between the second pointer gear wheel 3*a* and the wheel train holding member 6, the outer circumferential end section 20 of the bent wire 17 is reliably and favorably pressed against the upper surface of the wheel train holding member 6 at an inclination angle of about 10 degrees together with the inner circumferential end section 21 of the wire 17 on the small diameter section 16*a* side.

As a result of this structure, in the pointer device 1, the outer circumferential end section 20 of the wire 17 on the large diameter section 16*b* side of the spiral spring 16 is not positioned on the second pointer gear wheel 3*a*, and the bent section 18 on the outer circumferential portion of the large diameter section 16*b* is positioned on the undersurface of the second pointer gear wheel 3*a*. Accordingly, by the presence of the curved surface of the bent section 18, the spiral spring 16 is not caught by the second pointer gear wheel 3*a*, whereby the second pointer gear wheel 3*a* can be smoothly rotated with respect to the spiral spring 16.

Also, in the pointer device 1, since the outer circumferential end section 20 of the bent wire 17 is pressed against the upper surface of the wheel train holding member 6 at an inclination angle of about 10 degrees together with the inner circumferential end section 21 of the wire 17 on the small diameter section 16*a* side, the rotation of the spiral spring 16 with respect to the wheel train holding member 6 when the second pointer wheel 3 is being rotated can be reliably and favorably prevented and whereby the spiral spring 16 does not rotate with the second pointer gear wheel 3*a*.

Moreover, in the pointer device 1, the wire 17 constituting the spiral spring 16 has been wound in the same direction as the normal rotation direction of the second pointer gear wheel 3*a* which is the movement direction of the second pointer 2*a*, or in other words, the clockwise direction. As a result of this structure, when the second pointer gear wheel 3*a* is being rotated in the normal rotation direction, the outer circumferential end section 20 of the wire 17 on the large diameter section 16*b* side of the spiral spring 16 can be caught by the wheel train holding member 6. Similarly, when the second pointer gear wheel 3*a* is being rotated in the direction opposite to the normal rotation direction, the inner circumferential end section 21 of the wire 17 on the small diameter section 16*a* side of the spiral spring 16 can be caught by the wheel train holding member 6.

Furthermore, in the pointer device 1, the outer circumferential end section 20 of the large diameter section 16*b* and the inner circumferential end section 21 of the small diameter section 16*a* of the spiral spring 16 have been obliquely cut with respect to the central axis of the wire 17, and the first chamfered section 20*a* and the second chamfered section 21*a* have been formed on these cut portions forming sharp angles. Accordingly, by the presence of the first chamfered section 20*a* of the outer circumferential end section 20 of the wire 17 on the large diameter section 16*b* side and the second chamfered section 21*a* of the inner circumferential end section 21 of the wire 17 on the small diameter section 16*a* side, the outer circumferential end section 20 and the inner circumferential end section 21 of the wire 17 can be easily caught by the upper surface of the wheel train holding member 6.

More specifically, in the pointer device 1, when the second pointer wheel 3 is being rotated in the clockwise direction in which the second pointer 2*a* is moved, the outer circumferential end section 20 of the wire 17 is caught by the upper surface of the wheel train holding member 6 in the clockwise direction by the presence of the first chamfered section 20*a* of the sharply angled portion, whereby the clockwise rotation of the spiral spring 16 can be reliably and favorably prevented, and the upper surface of the wheel train holding member 6 can be prevented from being scratched by the outer circumferential end section 20 of the wire 17.

Similarly, in the pointer device 1, when the second pointer wheel 3 is being rotated in the direction opposite to the clockwise direction in which the second pointer 2*a* is moved, the inner circumferential end section 21 of the wire 17 is caught by the upper surface of the wheel train holding member 6 in the counterclockwise direction by the presence of the second chamfered section 21*a* of the sharply angled portion, whereby the counterclockwise rotation of the spiral spring 16 can be reliably and favorably prevented, and the upper surface of the wheel train holding member 6 can be prevented from being scratched by the inner circumferential end section 21 of the wire 17.

In the above-described embodiment, the large diameter section 16*b* of the spiral spring 16 is positioned on the undersurface of the second pointer gear wheel 3*a*, and the small diameter section 16*a* of the spiral spring 16 is positioned on the upper surface of the wheel train holding member 6. However, the present invention is not limited thereto, and a structure may be adopted in which the large diameter section 16*b* of the spiral spring 16 is positioned on the upper surface of the wheel train holding member 6, and the small diameter section 16*a* of the spiral spring 16 is positioned on the undersurface of the second pointer gear wheel 3*a*.

Also, in the above-described embodiment, the wire 17 corresponding to the outer circumferential portion of the large diameter section 16*b* of the spiral spring 16 is bent toward the wheel train holding member 6, and the outer circumferential end section 20 of this bent wire 17 is positioned on the wheel train holding member 6 together with the inner circumferential end section 21 of the wire 17 corresponding to the inner circumferential portion of the small diameter section 16*a*. However, the present invention is not limited thereto, and a structure may be adopted in which the wire 17 corresponding to the outer circumferential portion of the large diameter section 16*b* of the spiral spring 16 is bent toward the second pointer gear wheel 3*a*, and the outer circumferential end section 20 of this bent wire 17 is positioned on the second pointer gear wheel 3*a* together with the inner circumferential end section 21 of the wire 17 corresponding to the inner circumferential portion of the small diameter section 16*a*.

Moreover, in the above-described embodiment, the second plate spring 15 is arranged between the minute pointer gear wheel 4*a* of the minute pointer wheel 4 and the intermediate holding member 8, and the first plate spring 14 is arranged between the hour pointer gear wheel 5*a* of the hour pointer wheel 5 and the gearwheel hold-down member 13. However, the present invention is not limited thereto, and a structure may be adopted in which same spiral springs as the spiral spring 16 arranged between the second pointer gear wheel 3*a* of the second pointer wheel 3 and the wheel train holding member 6 are arranged instead of the first plate spring 14 and the second plate spring 15.

Furthermore, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. Also, the present invention is applicable to measuring devices such as meters and gauges.

While the present invention has been described with reference to the preferred embodiments, it is intended that the invention be not limited by any of the details of the description therein but includes all the embodiments which fall within the scope of the appended claims.

What is claimed is:

1. A pointer device comprising:
- a rotation body;
- a pointer shaft provided on the rotation body;
- a base member which rotatably supports the pointer shaft, and
- a spiral spring which has a truncated conical shape and is arranged between the rotation body and the base member,
- wherein a large diameter portion of the spiral spring is positioned on a surface of either of the rotation body and the base member, and a small diameter portion of the spiral spring is arranged on a surface of the other of the rotation body and the base member,
- wherein the spiral spring is formed in the truncated conical shape by a wire being wound in a spiral shape and the small diameter portion being raised higher than the large diameter portion in an expansion/contraction direction, and
- wherein a portion of the wire corresponding to an outer circumferential portion of the large diameter portion of the spiral spring is bent toward the base member, and an end of the bent portion of the wire is positioned on the base member together with an end of the wire corresponding to an inner circumferential portion of the small diameter portion.

2. The pointer device according to claim 1, wherein a length of the spiral spring in a expansion/contraction direction when the spiral spring is in a free state is greater than an interval between the rotation body and the base member.

3. The pointer device according to claim 1, wherein the spiral spring is arranged such that the large diameter portion is positioned on the rotation body and the small diameter portion is positioned on the base member.

4. The pointer device according to claim 1, wherein the spiral spring is formed by a wire being wound in a same direction as a normal rotation direction of the rotation body.

5. A timepiece comprising the pointer device according to claim 1.

6. A pointer device, comprising:
- a rotation body;
- a pointer shaft provided on the rotation body;
- a base member which rotatably supports the pointer shaft, and a spiral spring which has a truncated conical shape and is arranged between the rotation body and the base member, wherein a large diameter portion of the spiral spring is positioned on a surface of either of the rotation body and the base member, and a small diameter portion of the spiral spring is arranged on a surface of the other of the rotation body and the base member, wherein the spiral spring is formed in the truncated conical shape by a wire being wound in a spiral shape and the small diameter portion being raised higher than the large diameter portion in an expansion/contraction direction, wherein an end of the large diameter portion and an end of the small diameter portion of the spiral spring are obliquely cut with respect to a central axis of the wire so as to form acute angles, and wherein chamfered portions are formed on the obliquely cut ends.

* * * * *